(12) United States Patent
Ishida et al.

(10) Patent No.: US 12,393,808 B2
(45) Date of Patent: Aug. 19, 2025

(54) NON-TRANSITORY COMPUTER-READABLE RECORDING MEDIUM, INFORMATION PROCESSING METHOD, AND INFORMATION PROCESSING APPARATUS

(71) Applicant: Fujitsu Limited, Kawasaki (JP)

(72) Inventors: Ryo Ishida, Kawasaki (JP); Daisuke Uchida, Kawasaki (JP); Yasuhiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/452,211

(22) Filed: Aug. 18, 2023

(65) Prior Publication Data

US 2024/0193389 A1   Jun. 13, 2024

(30) Foreign Application Priority Data

Dec. 7, 2022 (JP) ................................. 2022-195834

(51) Int. Cl.
*G06K 7/14* (2006.01)
*G06V 10/22* (2022.01)

(52) U.S. Cl.
CPC ......... *G06K 7/1443* (2013.01); *G06K 7/1417* (2013.01); *G06K 7/1473* (2013.01); *G06V 10/225* (2022.01)

(58) Field of Classification Search
CPC .. G06K 7/1443; G06K 7/1417; G06K 7/1473; G06V 10/225
USPC .................................................... 235/462.09
See application file for complete search history.

(56) References Cited

U.S. PATENT DOCUMENTS

| | | | |
|---|---|---|---|
| 9,189,911 B2 | 11/2015 | Kavli et al. | |
| 2004/0223663 A1 | 11/2004 | Cato | |
| 2008/0149725 A1 | 6/2008 | Rosenbaum | |
| 2010/0114617 A1* | 5/2010 | Bobbitt | G06Q 20/202 |
| | | | 705/75 |

(Continued)

FOREIGN PATENT DOCUMENTS

| | | |
|---|---|---|
| JP | 2020-053019 A | 4/2020 |
| JP | 2021-135620 | 9/2021 |

(Continued)

OTHER PUBLICATIONS

EESR—Extended European Search Report mailed on Feb. 6, 2024 for corresponding European Patent Application No. 23193867.1 [8 pages].

(Continued)

*Primary Examiner* — Allyson N Trail
(74) *Attorney, Agent, or Firm* — Fujitsu Intellectual Property Center

(57) ABSTRACT

An information processing apparatus acquires video image data on a person who is scanning a code of a commodity product to an accounting machine. The information processing apparatus identifies, from the video image data by analyzing the acquired video image data, each of an entire region of the commodity product and a position of a code held by the commodity product. The information processing apparatus generates, based on the identified position of the code held by the commodity product with respect to the entire region of the commodity product, an alert that indicates an abnormality of a behavior of registering the commodity product to the accounting machine.

10 Claims, 15 Drawing Sheets

(56) References Cited

U.S. PATENT DOCUMENTS

| | | |
|---|---|---|
| 2012/0193416 A1 | 8/2012 | Smith et al. |
| 2012/0321146 A1* | 12/2012 | Kundu ................. G06Q 20/208 340/568.8 |
| 2013/0001290 A1 | 1/2013 | Trajkovic et al. |
| 2018/0096567 A1* | 4/2018 | Farrow ................. G06V 40/161 |
| 2020/0234056 A1* | 7/2020 | Pricochi ............... G07G 1/0063 |
| 2021/0169879 A1* | 6/2021 | Van Der Plas ......... A61P 37/06 |
| 2021/0264716 A1* | 8/2021 | Norbeck ................. G07F 11/58 |
| 2021/0272086 A1 | 9/2021 | Buibas et al. |
| 2021/0374376 A1 | 12/2021 | Swope et al. |
| 2022/0309855 A1* | 9/2022 | Patnaikuni ......... G08B 21/0476 |
| 2023/0008200 A1* | 1/2023 | Budano ..................... G07C 9/37 |
| 2023/0153831 A1* | 5/2023 | Budano ............. G06K 7/10415 705/318 |
| 2023/0203164 A1* | 6/2023 | Su ....................... C07K 16/2818 414/141.1 |
| 2023/0206633 A1* | 6/2023 | Kohata ................. G06V 40/20 382/103 |
| 2023/0368278 A1* | 11/2023 | Robinson ............. G06Q 20/203 |
| 2024/0104582 A1* | 3/2024 | Budano ................. G06F 16/285 |
| 2024/0193993 A1* | 6/2024 | Ishida .................... G06V 20/52 |
| 2024/0193995 A1* | 6/2024 | Ishida .................... G06V 20/52 |
| 2024/0211952 A1* | 6/2024 | Obinata ................. G06V 10/70 |
| 2024/0212351 A1* | 6/2024 | Obinata ............... G06Q 20/206 |

FOREIGN PATENT DOCUMENTS

| | | |
|---|---|---|
| JP | 2022-104223 | 7/2022 |
| KR | 10-2233126 | 3/2021 |

OTHER PUBLICATIONS

KROA—Office Action of Korean Patent Application No. 10-2023-0116048 mailed on Mar. 12, 2025, with English translation [12 pages]. **Reference US2008/0149725 cited in the KROA was previously submitted in the IDS filed on Feb. 21, 2024.

* cited by examiner

| PATTERN | SURFACE OF COMMODITY PRODUCT | POSITION OF BAR CODE |
|---|---|---|
| PATTERN 1 | UPPER SURFACE AND SIDE SURFACE | POSITION OPPOSITE TO LABEL |
| PATTERN 2 | UPPER SURFACE | SIDE SURFACE OF COMMODITY PRODUCT |
| ... | ... | ... |

NON-TRANSITORY COMPUTER-READABLE RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2022-195834, filed on Dec. 7, 2022, the entire contents of which are incorporated herein by reference.

FIELD

The embodiments discussed herein are related to an information processing program, an information processing method, and an information processing apparatus.

BACKGROUND

In stores, such as supermarkets and convenience stores, self-service checkout registers are becoming widely used. A self-service checkout register is a point of sale (POS) checkout register system in which a user who purchases commodity products perform a series of processes between a process of reading bar code assigned to each of the commodity products and a process of calculating a payment amount. For example, by installing the self-service checkout register, it is possible to improve a labor shortage caused by a decrease in population and suppress labor costs.

Patent Document 1: Japanese Laid-open Patent Publication No. 2020-53019

SUMMARY

According to an aspect of an embodiment, a non-transitory computer-readable recording medium stores therein an information processing program that causes a computer to execute a process. The process includes acquiring video image data on a person who is scanning a code of a commodity product to an accounting machine, identifying, from the video image data by analyzing the acquired video image data, each of an entire region of the commodity product and a position of a code held by the commodity product, and generating, based on the identified position of the code held by the commodity product with respect to the entire region of the commodity product, an alert that indicates an abnormality of a behavior of registering the commodity product to the accounting machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

However, in the technology described above, it is difficult to detect a fraud. For example, at an accounting machine, such as a self-service checkout register, an inevitable error, an intentional fraud, or the like is made by a user, thus resulting in incurring an unpaid amount or the like.

An example of the inevitable error includes a scan omission of a commodity product as a result of a user forgetting to scan the commodity product and moving the commodity product from a basket to a checkout bag, and the like. In addition, examples of the intentional fraud include a bar code hiding occurring when a user pretends to scan a commodity product by hiding only a bar code by the user's fingers, a read error occurring when a user erroneously reads a bar code assigned to a can instead of a bar code assigned to a beer case as a result of different bar codes being assigned to each of the beer case containing, for example, a set of six cans and the individual cans, and the like.

In addition, it is conceivable to detect a fraud by automatically counting the number of commodity products by installing a weight sensor in each of the self-service checkout registers; however, a cost is excessively high, and this method is unrealistic for, in particular, large-scale stores and stores having operations across the country.

In addition, at the self-service checkout register, there is another aspect in which it is difficult to detect a fraudulent act because a scan of a commodity product code or calculation of a payment amount is entrusted by a user himself or herself. For example, even if image recognition Artificial Intelligence (AI) is used in an aspect of detecting the fraudulent act described above, a huge amount of training data is needed for training of the image recognition AI. However, in stores, such as supermarkets and convenience stores, many types of commodity products are present, and, in addition, a life cycle of each of the commodity products is short, so that a replacement of each of commodity products frequently occurs. It is difficult to tune the image recognition AI in accordance with the life cycle of these types of commodity products, or it is difficult to perform training of new image recognition AI.

Figure 1:
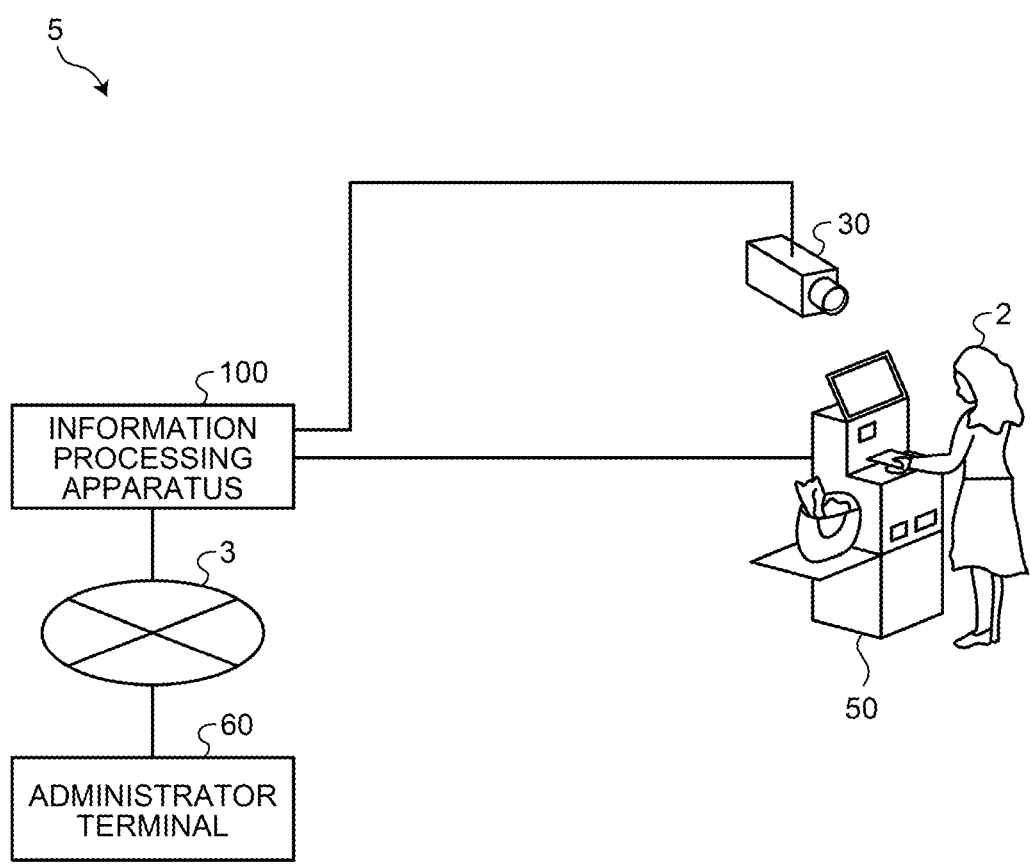
Figure 2:
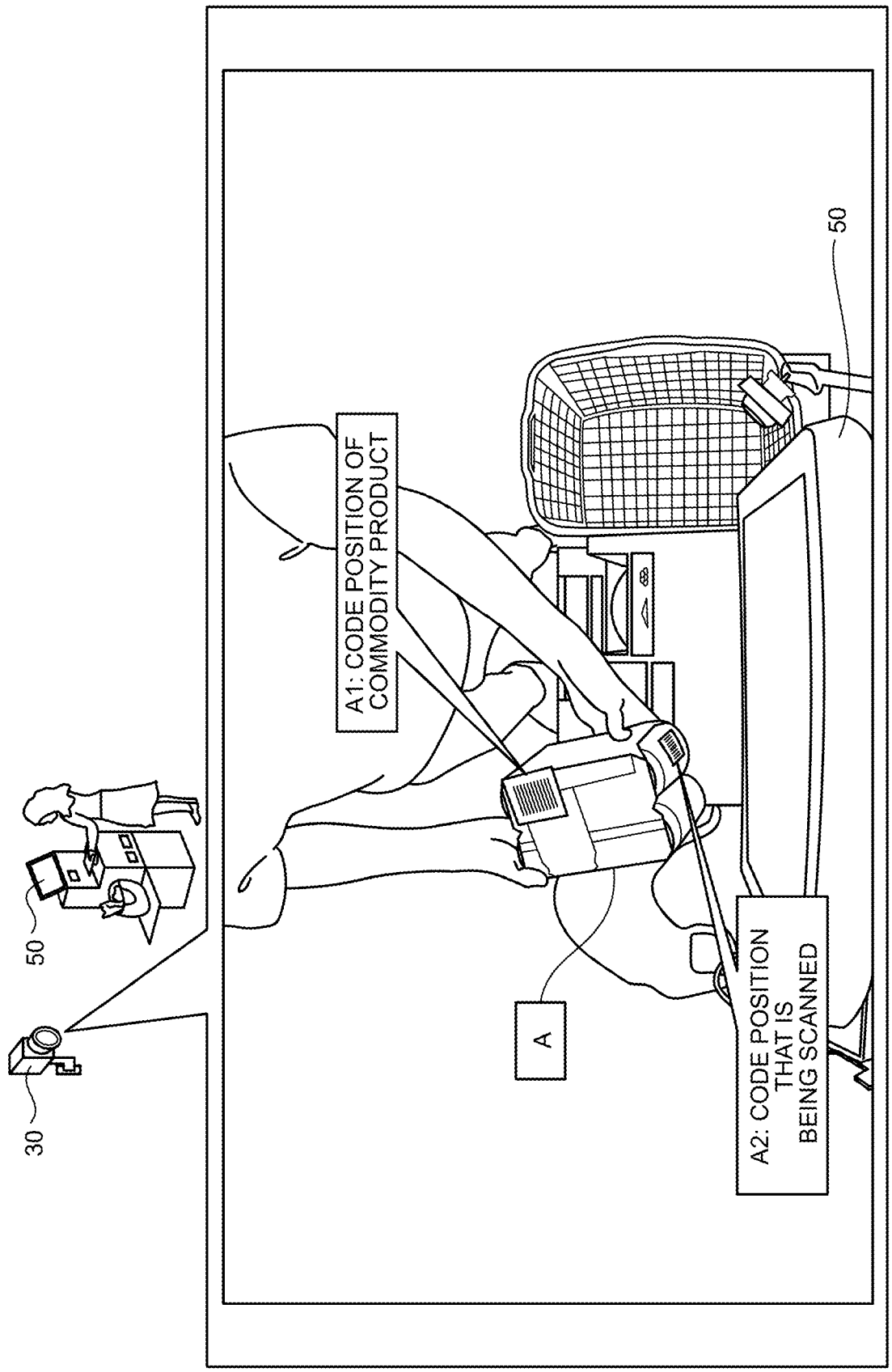
Figure 3:
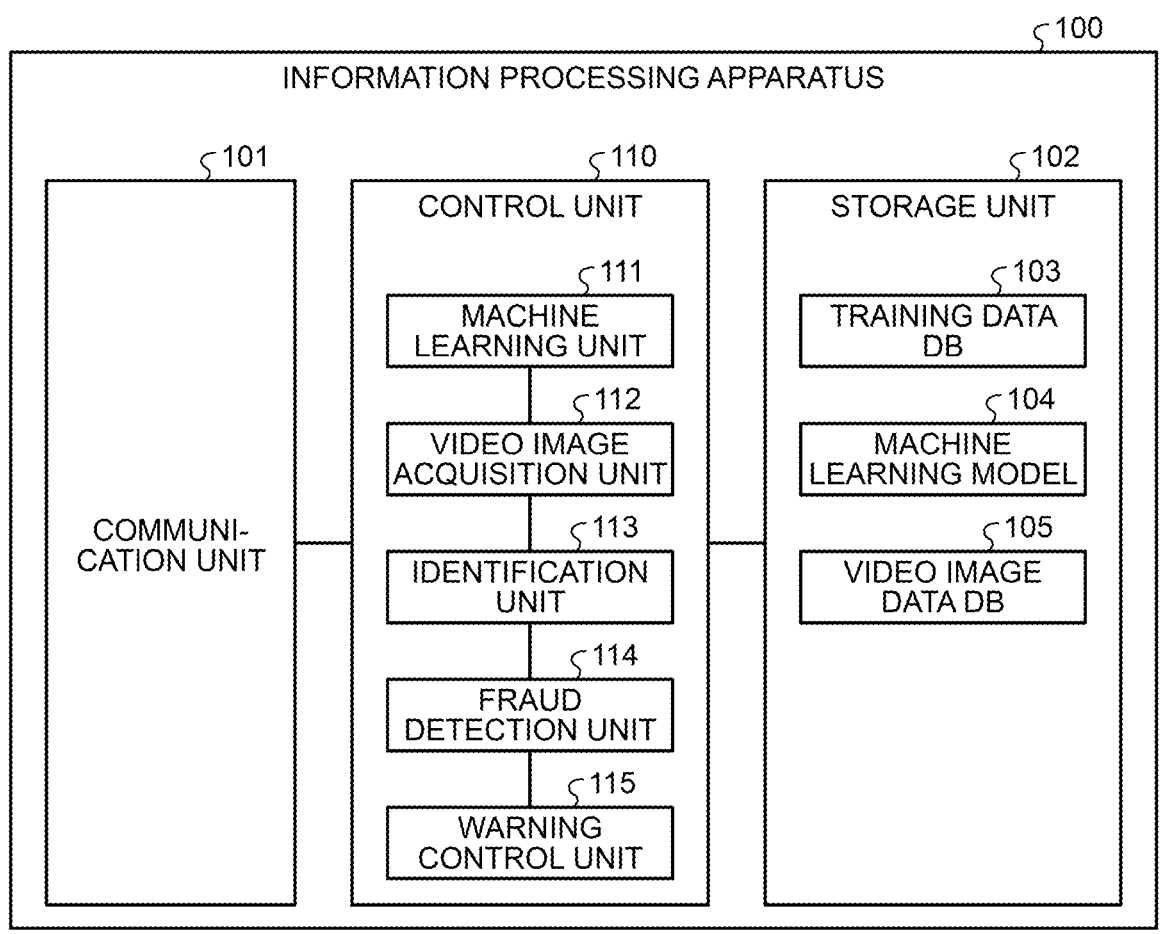
Figure 4:
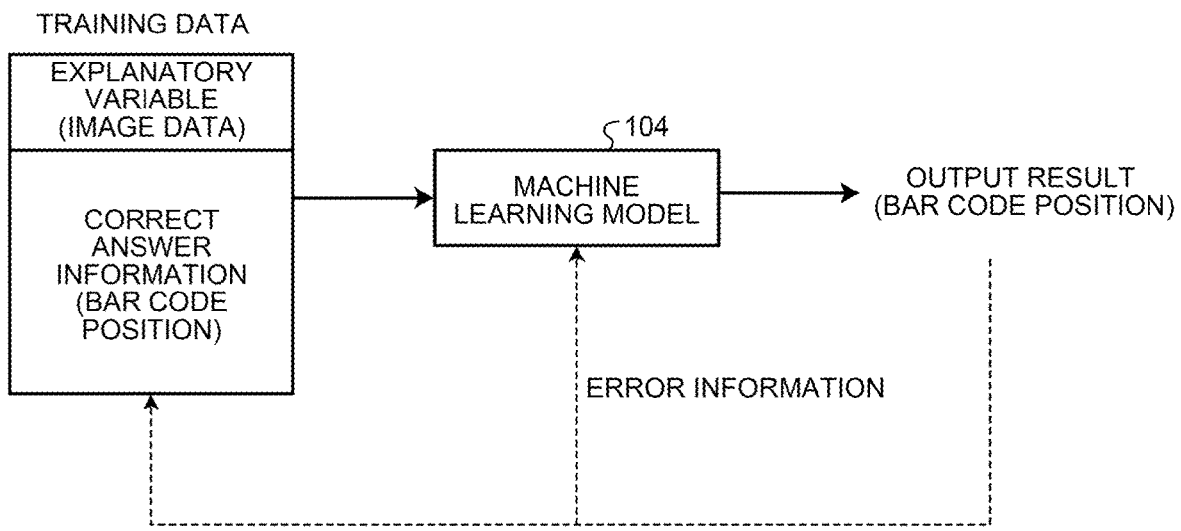
Figure 5:
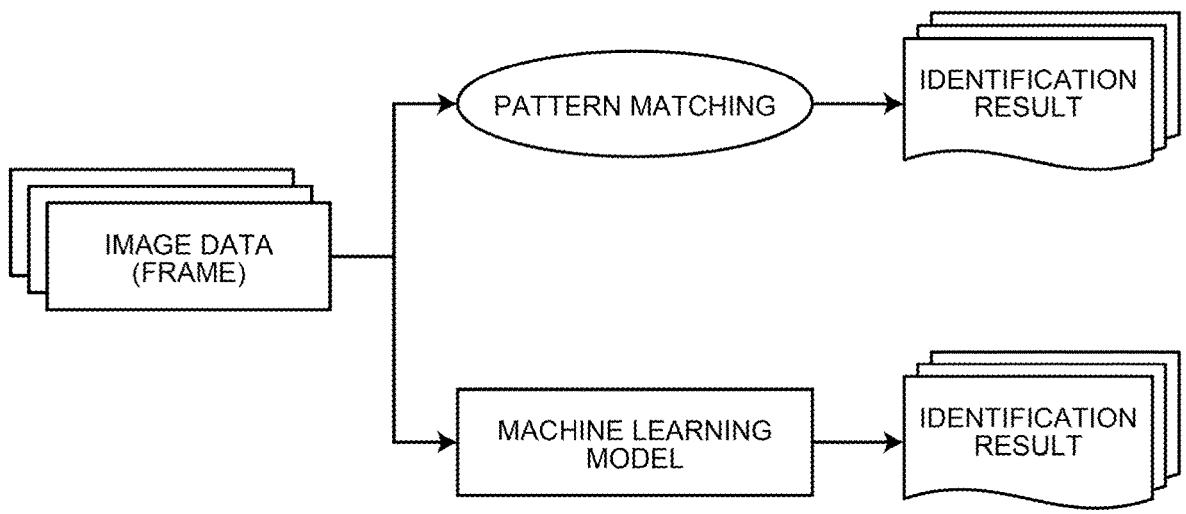
Figure 6:
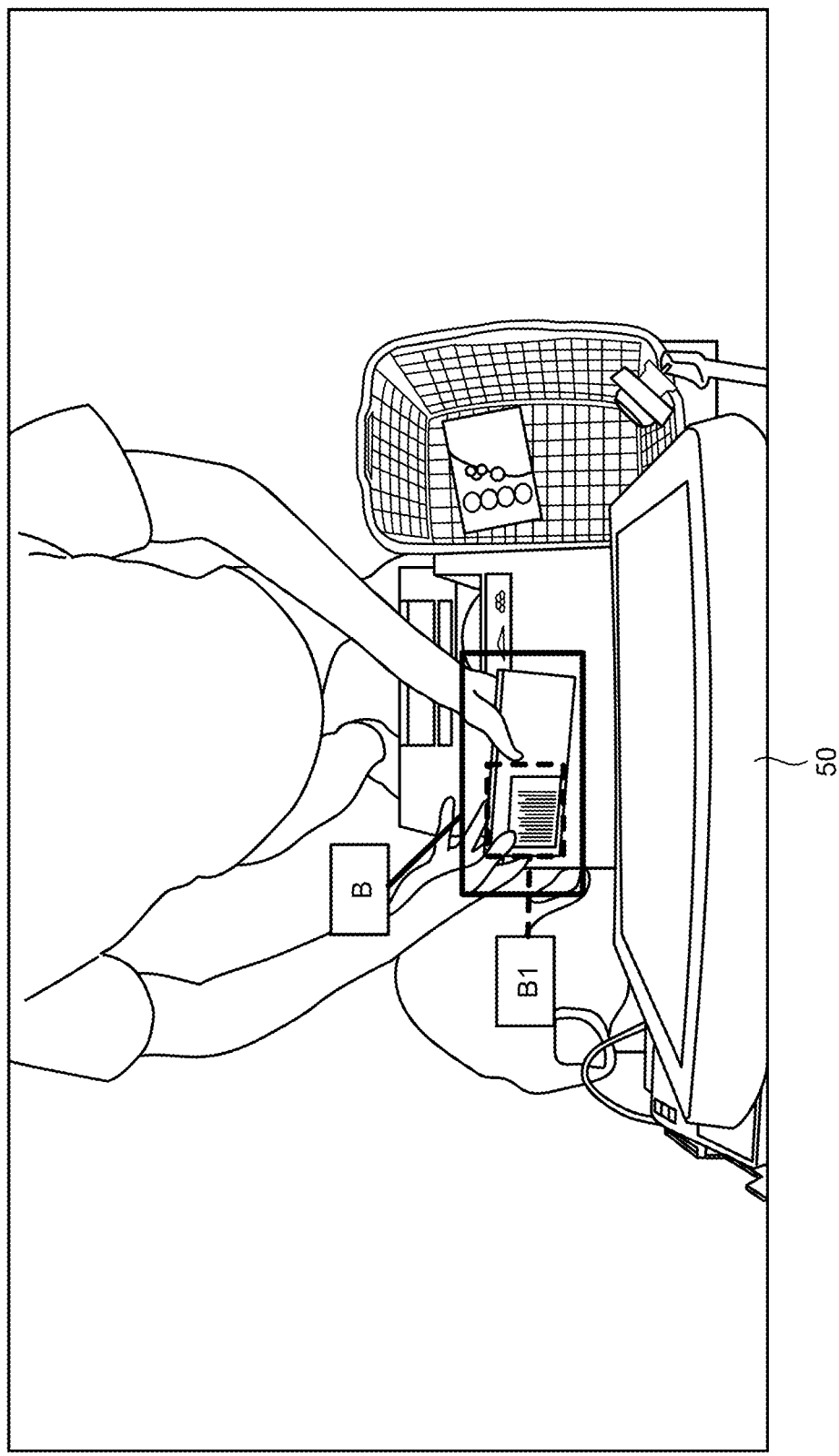
Figure 7:
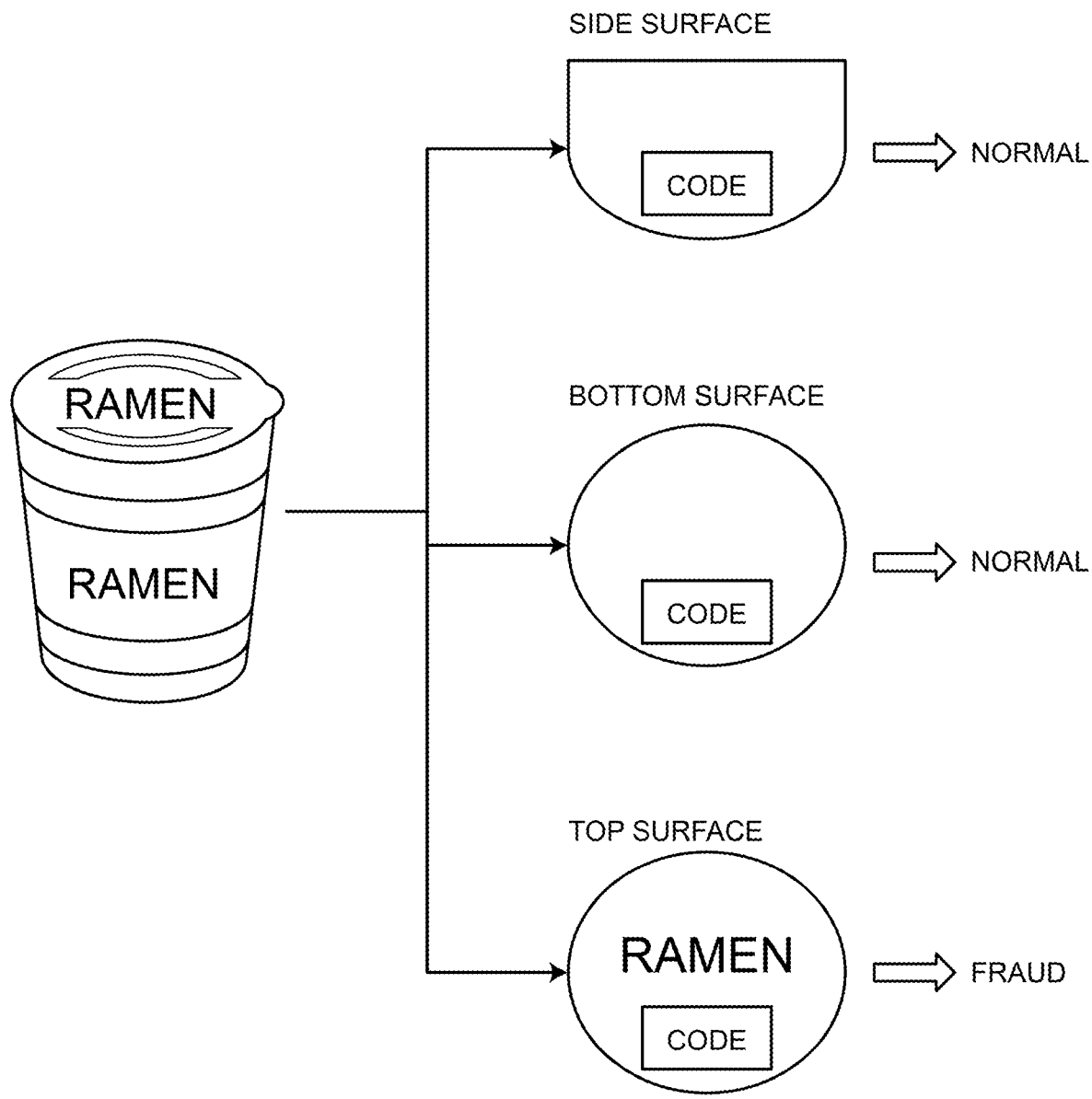
Figure 8:
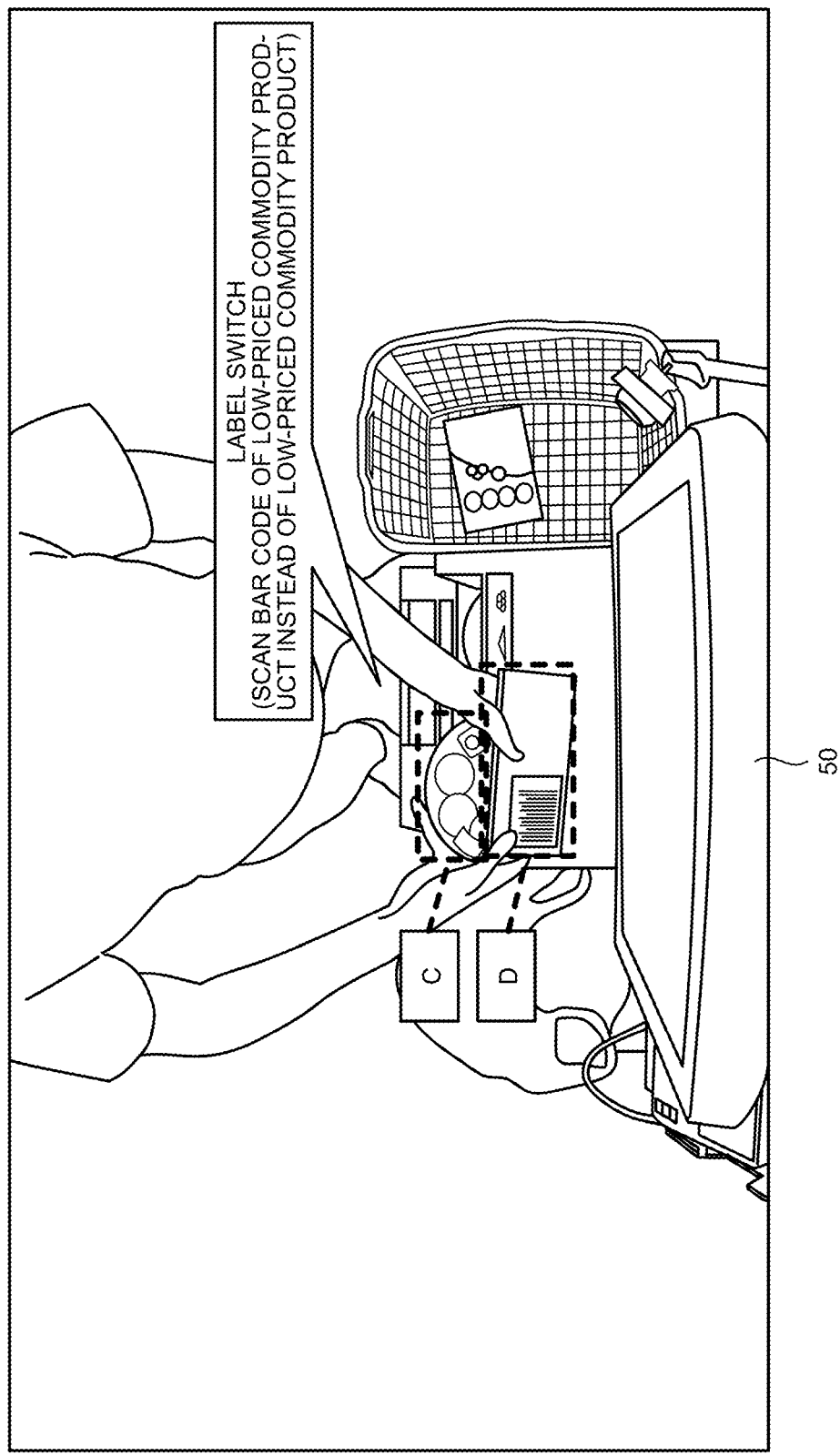
Figure 9:
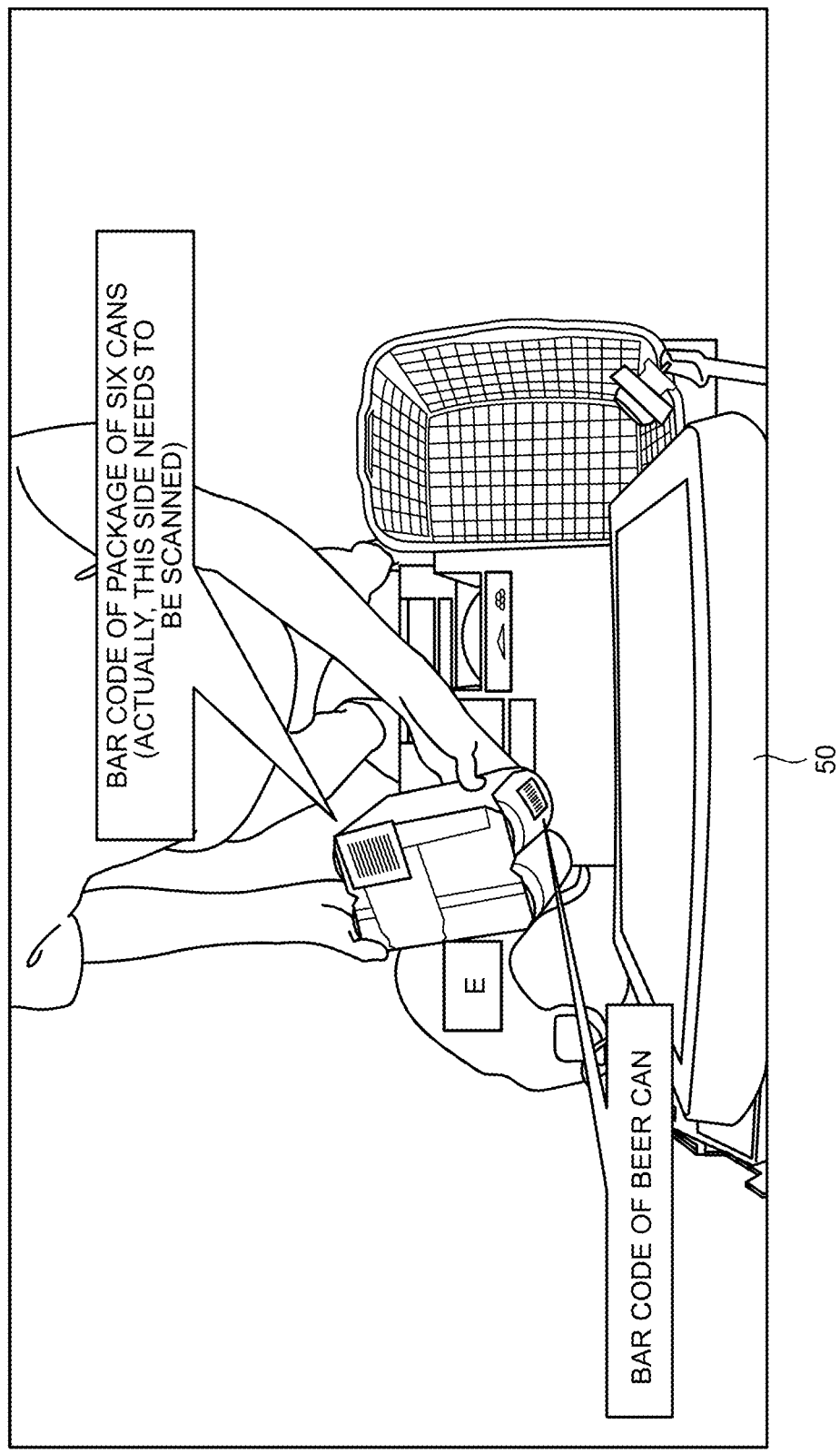
Figure 10:
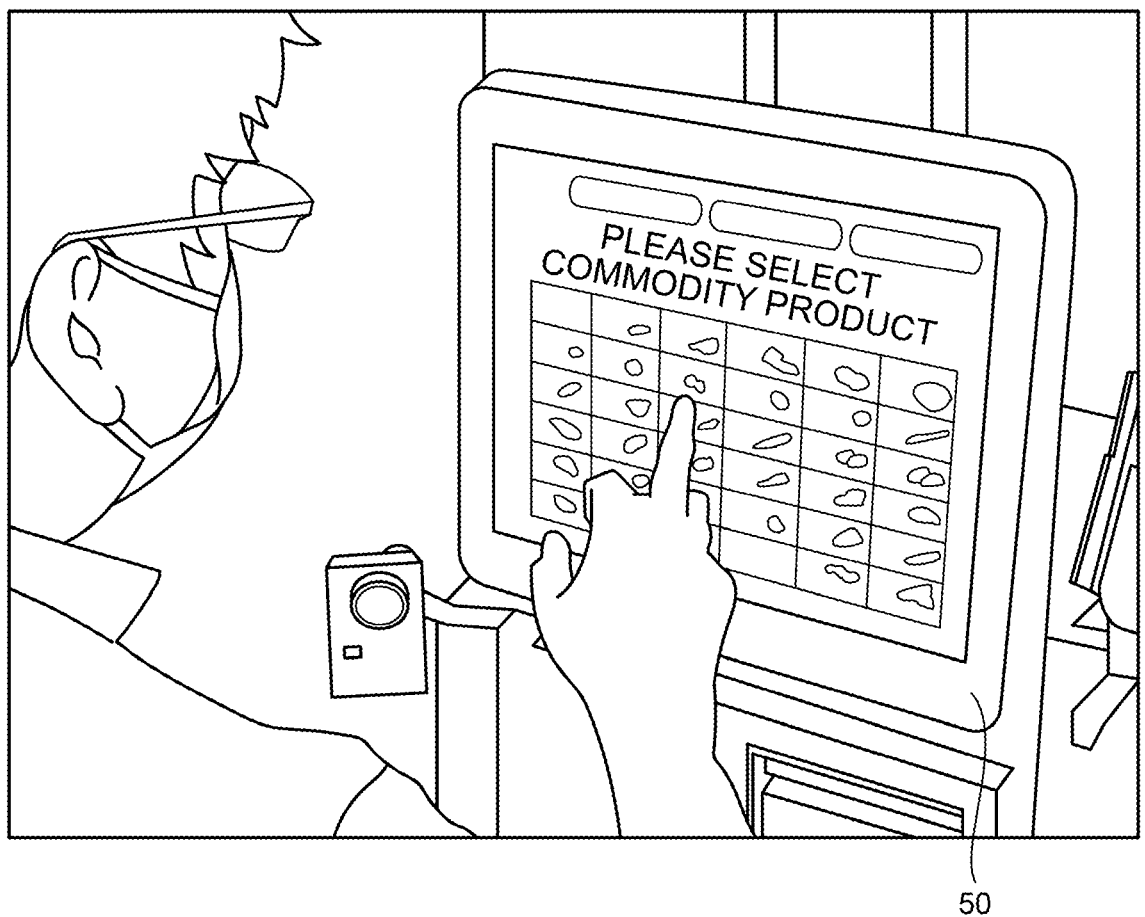
Figure 11:
Figure 12:
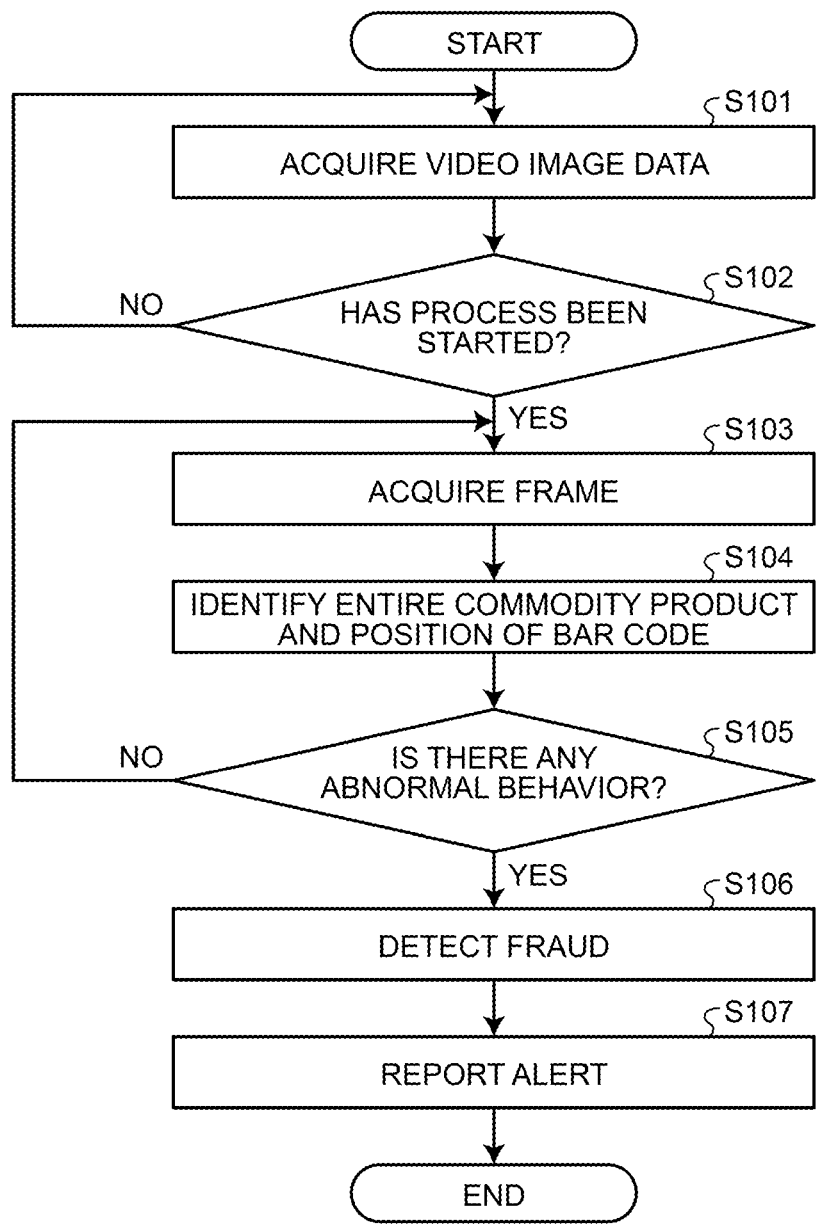
Figure 13:
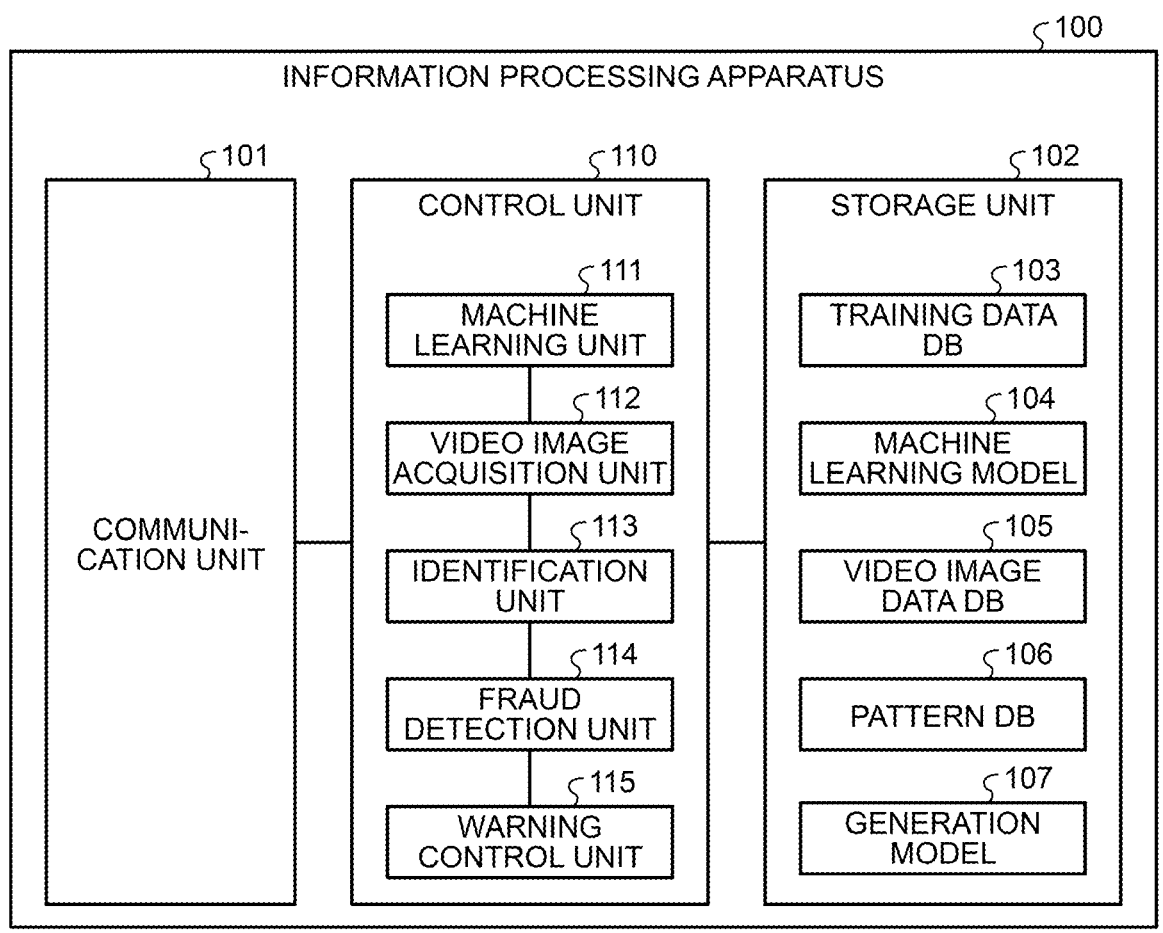
Figures 14, 15:
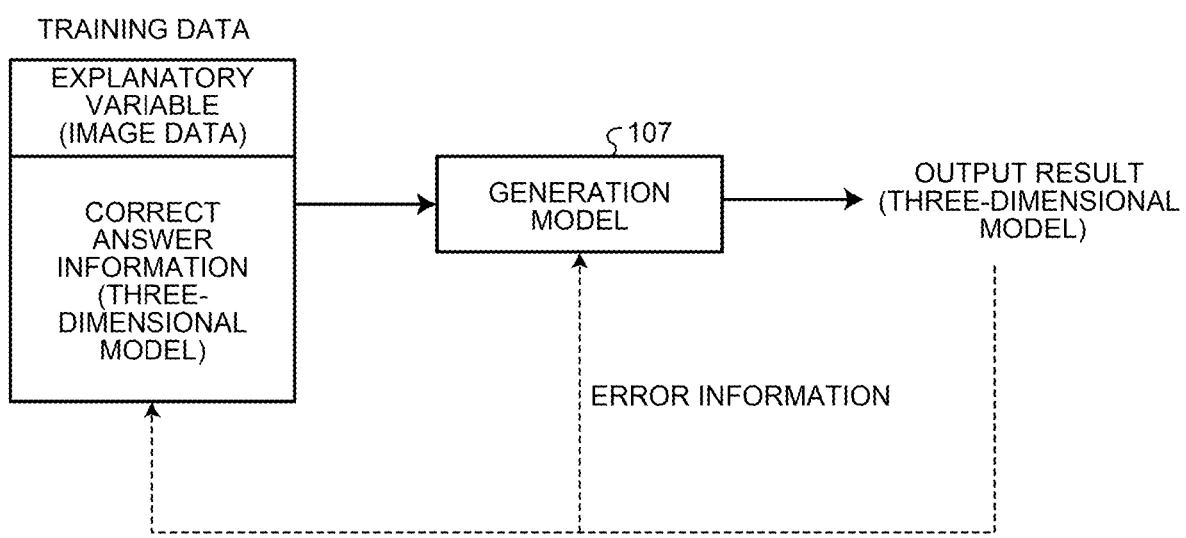
Figure 16:
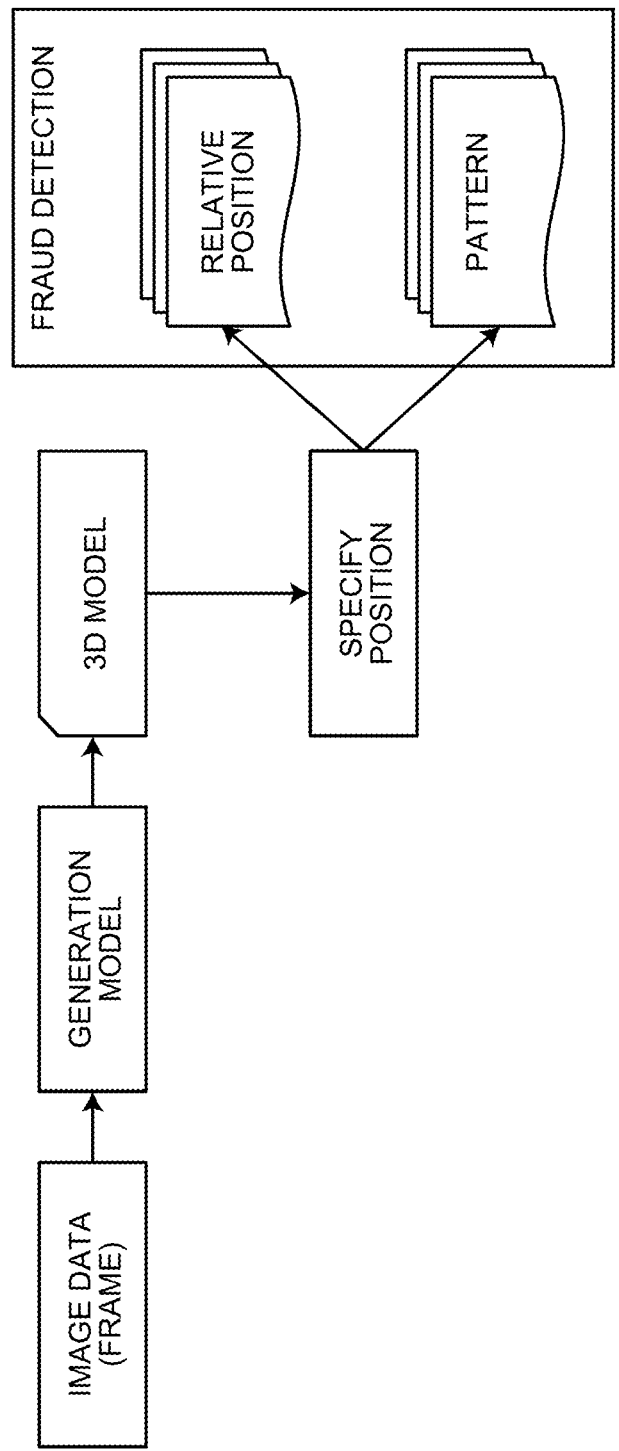
Figure 17:
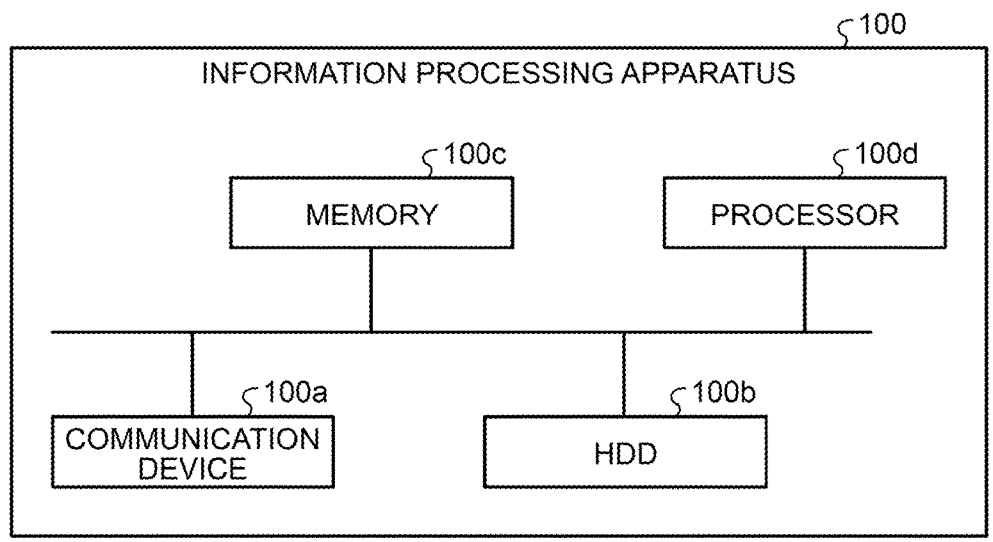

FIG. 1 is a diagram illustrating an example of the overall configuration of a self-service checkout register system according to a first embodiment;

FIG. 2 is a diagram illustrating an example of fraud detection according to a first embodiment;

FIG. 3 is a functional block diagram illustrating a functional configuration of an information processing apparatus according to the first embodiment;

FIG. 4 is a diagram illustrating machine learning performed on the machine learning model;

FIG. 5 is a diagram illustrating an identification process;

FIG. 6 is a diagram illustrating an identification result;

FIG. 7 is a diagram illustrating fraud detection performed on the basis of a positional relationship;

FIG. 8 is a diagram illustrating an example of a fraud to be detected;

FIG. 9 is a diagram illustrating an example of a fraud conducted on a set commodity product;

FIG. 10 is a diagram illustrating an example of a fraudulent motion;

FIG. 11 is a diagram illustrating a report example of an alert;

FIG. 12 is a flowchart illustrating the flow of a process;

FIG. 13 is a functional block diagram illustrating a functional configuration of an information processing apparatus according to a second embodiment;

FIG. 14 is a diagram illustrating an example of information stored in a pattern DB;

FIG. 15 is a diagram illustrating machine learning performed on a generation model;

FIG. 16 is a diagram illustrating fraud detection;

FIG. 17 is a diagram illustrating an example of a hardware configuration; and

Figure 18:
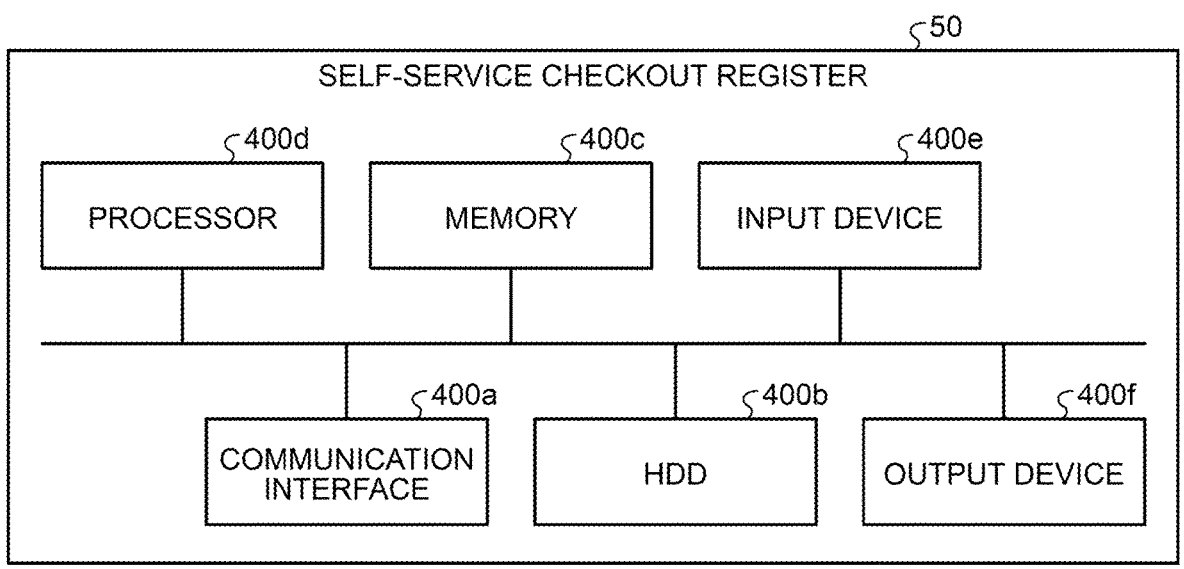

FIG. 18 is a diagram illustrating an example of a hardware configuration of a self-service checkout register.

DESCRIPTION OF EMBODIMENTS

Preferred embodiments will be explained with reference to accompanying drawings. Furthermore, the present embodiment is not limited by the embodiments. In addition, each of the embodiments can be used in any appropriate combination as long as they do not conflict with each other.

(a) First Embodiment

Explanation of Self-Service Checkout Register System

FIG. 1 is a diagram illustrating an example of the overall configuration of a self-service checkout register system 5 according to a first embodiment. As illustrated in FIG. 1, the self-service checkout register system 5 includes a camera 30, a self-service checkout register 50, an administrator terminal 60, and an information processing apparatus 100.

The information processing apparatus 100 is one example of a computer that is connected to the camera 30 and the self-service checkout register 50. The information processing apparatus 100 is connected to the administrator terminal 60 via a network 3 that is applicable to various communication networks irrespective of a wired or wireless manner. The camera 30 and the self-service checkout register 50 may be connected to the information processing apparatus 100 via the network 3.

The camera 30 is one example of a camera that captures a video image of a region including the self-service checkout register 50. The camera 30 transmits data on the video image to the information processing apparatus 100. In a description below, the data on the video image is sometimes referred to as "video image data" or is sometimes simply referred to as a "video image".

In the video image data, a plurality of image frames obtained in time series are included. A frame number is assigned to each of the image frames in an ascending order in time series. A single image frame is image data of a still image that is captured by the camera 30 at a certain timing.

The self-service checkout register 50 is one example of a POS checkout register system or an accounting machine in which a user 2 who purchases a commodity product performs a series of processes between a process of reading a bar code assigned to the commodity product and a process of calculating a payment amount. For example, if the user 2 moves a commodity product targeted for a purchase to a scan region included in the self-service checkout register 50, the self-service checkout register 50 scans the bar code assigned to the commodity product, and registers the commodity product as the commodity product targeted for the purchase.

In addition, as described above, the self-service checkout register 50 is one example of a self-service checkout register in which a customer registers the commodity products to be purchased (checkout register work) and makes a payment by himself or herself, and is called, for example, self-checkout, automated checkout, self-checkout machine, self-check-out register, or the like. The bar code is a kind of an identifier representing a numerical value or a letter according to the width of each of the lines constituting a striped pattern shape, and it is possible to specify an amount of money, a category (for example, foods), or the like of a commodity product by scanning (reading) the bar code by the self-service checkout register 50. The bar code is one example of a code, and, in addition to the bar code, it is possible to use a two-dimensional code, such as a quick response (QR) code, having the same function.

The user 2 repeatedly performs a motion of registering the commodity product described above, and, when a scan of the commodity products has been completed, the user 2 operates a touch panel of the self-service checkout register 50, and makes a request for calculation of a payment amount. When the self-service checkout register 50 receives the request for calculation of the payment amount, the self-service checkout register 50 presents the number of commodity products targeted for the purchase, an amount of money for the purchase, and the like, and then, performs a process of calculation of the payment amount. The self-service checkout register 50 stores, as self-service checkout register data (commodity product information) in a storage unit, information on the commodity products scanned in a period of time between a point at which the user 2 starts the scan and a point at which the user 2 makes the request for calculation of the payment amount, and then, transmits the information to the information processing apparatus 100. In addition, the user carries the commodity product, to the self-service checkout register 50, by putting the commodity products that are targeted for a purchase selected inside of a store into a carrying tool, such as a shopping basket or a commodity product cart.

The administrator terminal 60 is one example of a terminal device that is used by an administrator of the store. The administrator terminal 60 receives, from the information processing apparatus 100, a notification of an alert or the like indicating that a fraud related to a purchase of a commodity product has been conducted.

With this configuration, the information processing apparatus 100 acquires video image data on a person who is scanning a bar code assigned to a commodity product to the self-service checkout register 50. The information processing apparatus 100 identifies, from the video image data by analyzing the acquired video image data, each of the entire region of the commodity product and the position of the bar code held by the commodity product. The information processing apparatus 100 generates, on the basis of the identified position of the bar code held by the commodity product with respect to the entire region of the commodity product, an alert that indicates an abnormality of a behavior of registering the commodity product to the self-service checkout register 50.

FIG. 2 is a diagram illustrating an example of fraud detection according to the first embodiment. As illustrated in FIG. 2, the information processing apparatus 100 specifies a commodity product A from the video image data, and identifies the entire region of the commodity product A and a position A1 of the bar code assigned to the commodity product A. Then, in the case where the information processing apparatus 100 detects another position A2 that is different from the bar code position A1 assigned to the commodity product A at a scan position at which the commodity product A is scanned by the self-service checkout register 50 and registered to the self-service checkout register 50, the information processing apparatus 100 determines that a possibility of a fraudulent behavior is high, generates an alert, and reports of this state.

In general, the relative position between a label indicating a commodity product name, a design of the commodity product, or the like and the bar code displayed on the commodity product is set in an associated manner by previously assuming that, for example, the bar code is not present at the center of the label. Accordingly, the information processing apparatus 100 specifies the position representing the characteristic of the commodity product, such as the label or the design, from the video image data, and determines, on the basis of the positional relationship (relative position) between the position representing the characteristic and the position of the commodity product to be scanned, whether or not a motion is a normal scan motion or an abnormal scan motion.

As a result, the information processing apparatus 100 is able to detect a fraud conducted at the self-service checkout register by analyzing the video image data without preparing a complicated device.

Functional Configuration

FIG. 3 is a functional block diagram illustrating a functional configuration of the information processing apparatus 100 according to the first embodiment. As illustrated in FIG. 3, the information processing apparatus 100 includes a communication unit 101, a storage unit 102, and a control unit 110.

The communication unit 101 is a processing unit that controls communication with another device and is implemented by, for example, a communication interface or the like. For example, the communication unit 101 receives video image data from the camera 30, and outputs a processing result obtained by the control unit 110 to the administrator terminal 60.

The storage unit 102 is a processing unit that stores therein various kinds of data, a program executed by the control unit 110, or the like, and is implemented by, for example, a memory, a hard disk, or the like. The storage unit 102 stores therein a training data DB 103, a machine learning model 104, and a video image data DB 105.

The training data DB 103 is a database that stores therein data that is used for a training of the machine learning model 104. For example, the training data stored in the training data DB 103 is supervised data including "image data on a commodity product" as an explanatory variable and a "bar code position of the commodity product" as an objective variable.

The machine learning model 104 is a machine learning model that estimates, in accordance with an input of the video image data, a position of the bar code held by the commodity product included in the video image data. For example, the machine learning model 104 outputs an estimation result obtained by estimating the position of the bar code held by the commodity product with respect to each of the pieces of image data (each frame) included in the video image data.

In addition, for the machine learning model 104, it is also possible to use a machine learning model that is trained such that the entire region of the commodity product included in the video image data and the bar code position of the commodity product are output in accordance with an input of the video image data.

The video image data DB 105 is a database that stores therein the video image data captured by the camera 30 that is installed in the self-service checkout register 50. For example, the video image data DB 105 stores therein the video image data obtained by each of the self-service checkout registers 50 or each of the cameras 30.

The control unit 110 is a processing unit that manages the entirety of the information processing apparatus 100 and is implemented by, for example, a processor or the like. The control unit 110 includes a machine learning unit 111, a video image acquisition unit 112, an identification unit 113, a fraud detection unit 114, and a warning control unit 115. In addition, the machine learning unit 111, the video image acquisition unit 112, the identification unit 113, the fraud detection unit 114, and the warning control unit 115 are implemented by an electronic circuit that is included in a processor or implemented by a process or the like that is executed by the processor.

Machine Learning

The machine learning unit 111 is a processing unit that performs machine learning on the machine learning model 104 by using each of the pieces of training data that are stored in the training data DB 103. FIG. 4 is a diagram illustrating machine learning performed on the machine learning model 104. As illustrated in FIG. 4, the machine learning unit 111 inputs, to the machine learning model 104, training data in which "image data" is used as an explanatory variable and a "bar code position" is used as an objective variable, and then, calculates error information indicating an error between the output result of the "bar code position" and the objective variable of the "bar code position" in the machine learning model 104. Then, the machine learning unit 111 performs machine learning that updates the parameters of the machine learning model 104 by using error back propagation such that the error is decreased.

Video Image Acquisition

The video image acquisition unit 112 is a processing unit that acquires the video image data from the camera 30. For example, the video image acquisition unit 112 acquires the video image data from the camera 30 installed in the self-service checkout register 50 at any time, and stores the acquired video image data in the video image data DB 105.

Identification

The identification unit 113 is a processing unit that identifies each of the entire region of the commodity product and the position of the code held by the commodity product from the video image data by analyzing the video image data that has been acquired from the video image acquisition unit 11 by using the machine learning model or the like.

FIG. 5 is a diagram illustrating an identification process. As illustrated in FIG. 5, the identification unit 113 identifies the entire region of the commodity product and the position of the bar code assigned to the commodity product indicated in each of the pieces of image data that are included in the video image data by using the machine learning model 104, the pattern matching that is used in the image analysis, and the like. Then, the identification unit 113 stores the identification result in the storage unit 102, and outputs the identification result to the fraud detection unit 114.

Here, the identification result obtained by the identification unit 113 will be described. FIG. 6 is a diagram illustrating the identification result. FIG. 6 illustrates an image in which a wrapped plate shaped chocolate bar is being scanned. As illustrated in FIG. 6, the identification unit 113 identifies a region B including the entirety of the plate shaped chocolate bar and a position B1 of the bar code printed on the plate shaped chocolate bar.

In addition, the identification unit 113 identifies each of the entire region of a set commodity product that is set as a single commodity product containing a plurality of commodity products each having a code and that has a code as the single commodity product and the position of the code held by the set commodity product. For example, the identification unit 113 identifies the entire region of the commodity product of a canned beer set containing a set of six canned beers, and identifies the bar code position assigned to the canned beer set.

Fraud Detection

The fraud detection unit 114 is a processing unit that detects an abnormality of a behavior of registering the commodity product to the self-service checkout register 50 on the basis of the position of the bar code held by the commodity product with respect to the entire region of the commodity product that has been identified by the identification unit 113. Specifically, the fraud detection unit 114 detects a fraudulent behavior on the basis of the positional relationship between the feature region (feature position) represented by the commodity product name of the commodity product or the feature of the commodity product and the bar code assigned to the commodity product that has been identified from the video image data.

In other words, the fraud detection unit 114 detects the fraudulent behavior in the case where a predetermined region of the commodity product located at the scan position of the self-service checkout register 50 is a region in which the bar code on the commodity product is not included. Then, the fraud detection unit 114 notifies the warning control unit 115 of this state in the case where the fraud detection unit 114 has detected the fraudulent behavior.

FIG. 7 is a diagram illustrating an example of fraud detection performed on the basis of the positional relationship. As illustrated in FIG. 7, the fraud detection unit 114 detects a fraudulent scan motion on the basis of the positional relationship between the feature region (feature position) of the commodity product and bar code assigned to the commodity product that has been identified from the video image data. For example, as illustrated in FIG. 7, in the case where the commodity product is cup ramen, in general, a name of the cup ramen, a distinctive pictorial figure, distinctive words, and the like are described on the top surface, and the bar code assigned to the commodity product is not printed on the top surface. Therefore, in the case where the side surface or the bottom surface of the cup ramen is located at the scan position, the fraud detection unit 114 determines that a scan motion is a normal scan motion by analyzing the image data, whereas in the case where the top surface of the cup ramen is located at the scan position, the fraud detection unit 114 determines that a scan motion is a fraudulent scan motion.

The fraud detected in FIG. 7 corresponds to a fraud (for example, a label switch) conducted, at a time of a purchase of a high-priced commodity product, by attempting to purchase a high-priced commodity product at a low price by scanning a bar code assigned to a low-priced commodity product instead of the high-priced commodity product. FIG. 8 is a diagram illustrating an example of a detected fraud. As illustrated in FIG. 8, in the case where the commodity product has been normally scanned (in the case where the commodity product has been registered as the commodity product to be purchased) in spite of the fact that the top surface of a high-priced commodity product C is located at the scan position, it is conceivable that the user places a low-priced commodity product D on the top surface of a high-priced commodity product C, and scans the bar code assigned to the commodity product D instead of the bar code assigned to the commodity product C. Accordingly, the fraud detection unit 114 detects a fraud on the basis of the positional relationship illustrated in FIG. 7, so that the fraud detection unit 114 is able to detect the fraudulent behavior illustrated in FIG. 8.

In addition, in the case where, after both of a set commodity product and the bar code position of the set commodity product have been identified by the identification unit 113, the code of one of the commodity products included in the set commodity product is located at the scan position at which the commodity product is to be registered to the self-service checkout register 50, the fraud detection unit 114 detects that this case is a fraudulent scan motion.

FIG. 9 is a diagram illustrating an example of a fraud performed on a set commodity product. As illustrated in FIG. 9, it is conceivable to conduct a fraud by a user by using tactics for purchasing a set commodity product E at a low rate that is set to a single item commodity product by scanning the bar code that is assigned to the single item commodity product included in the set commodity product instead of scanning the position of the bar code that is assigned to the set commodity product E. However, the fraud detection unit 114 is able to identify the bar code position by using the identification unit 113 even in the case of the set commodity product, and is able to detect a fraud in the case where a scan has been performed at a position that is different from the identified bar code position, so that the fraud detection unit 114 is able to detect the fraudulent behavior illustrated in FIG. 9.

For example, the set commodity product containing six cans of alcoholic beverages is collectively wrapped by a wrapping material in a state in which a set of three cans are arranged in two rows such that six cans are able to be collectively carried. At this time, a bar code is assigned to the wrapping material that wraps a set of the plurality of cans containing the alcoholic beverages and another bar code is assigned to each of the six cans that contain the alcoholic beverages and that are wrapped by the wrapping material. The information processing apparatus 100 outputs an alert in the case where the bar code displayed on one of the alcoholic beverages wrapped by the wrapping material has been scanned to the accounting machine instead of the bar code displayed on the wrapping material.

In addition, in the case where the commodity product has been registered to the self-service checkout register 50 without a scan motion being detected in spite of the fact that the entire region of the commodity product and the bar code position of the commodity product haven been identified, the fraud detection unit 114 detects this case as a fraudulent motion.

FIG. 10 is a diagram illustrating an example of a fraudulent motion. As illustrated in FIG. 10, it is conceivable to conduct a fraud by a user by using tactics for purchasing a commodity product by selecting a low-priced commodity product by a touch panel of the self-service checkout register 50 in spite of the fact that a bar code has been assigned to the commodity product. However, the fraud detection unit 114 is able to detect a fraud in the case where a commodity product has been registered in spite of the fact that the bar code position of the identified commodity product is not present at the scan position, so that the fraud detection unit 114 is able to detect the fraudulent behavior illustrated in FIG. 10.

Alert Report

The warning control unit 115 is a processing unit that generates an alert and that performs report control of the alert in the case where a fraudulent behavior (fraudulent motion) has been detected by the fraud detection unit 114. For example, the warning control unit 115 generates an alert indicating that the commodity product that has not been registered to the self-service checkout register 50 by a person, or indicating that a commodity product that has been registered to the self-service checkout register 50 by a person is abnormal, and outputs the generated alert to the self-service checkout register 50 and the administrator terminal 60.

Furthermore, in the case where the warning control unit 115 generates an alert related to an abnormality of a behavior of registering a commodity product to the self-service checkout register 50, the warning control unit 115 outputs, from the self-service checkout register 50, voice or a screen that makes the person located at the self-service checkout register 50 aware of a registration omission of the commodity product.

FIG. 11 is a diagram illustrating a report example of the alert. As illustrated in FIG. 11, the warning control unit 115 causes the message indicating that "Is there any commodity product for a scan omission? Please scan the commodity products again.", or the like to be displayed on a display screen, such as a touch panel, of the self-service checkout register 50.

In addition, the warning control unit 115 causes a warning lamp installed in the self-service checkout register 50 to be turned on, causes an identifier of the self-service checkout register 50 and a message indicating that a fraud possibly occurs to be displayed on the administrator terminal 60, and causes the identifier of the self-service checkout register 50 and a message indicating an occurrence of the fraud and indicating that a check is needed to be transmitted to the terminal that is used by a store clerk who is present in an inside of a store.

In addition, in the case where an alert related to an abnormality of a behavior of registering a commodity product to the self-service checkout register 50 has been generated, the warning control unit 115 causes the camera 30 included in the self-service checkout register 50 to capture an image of a person, and to store the image data on the captured person and the alert in an associated manner in the storage unit. By doing so, it is possible to collect information on a fraudulent person who exhibits a fraudulent behavior, so that it is possible to make use of various measures to prevent the fraudulent behavior by detecting, at the entrance of the store, a customer who visits the store and who has a history of exhibiting a fraudulent behavior or the like. In addition, the warning control unit 115 is able to detect a fraudulent person from the image data on the person who uses the self-service checkout register 50, detect a fraudulent person at the entrance of the store, and the like by performing supervised learning using the image data on the fraudulent person and by generating the machine learning models. In addition, the warning control unit 115 is also able to acquire and store information on a credit card that is used by a person who has exhibited a fraudulent behavior from the self-service checkout register 50.

Flow of Process

FIG. 12 is a flowchart illustrating the flow of the process. As illustrated in FIG. 12, the information processing apparatus 100 acquires the video image data at any time (Step S101).

Subsequently, if the information processing apparatus 100 receives an instruction to start the process of fraud detection (Yes at Step S102), the information processing apparatus 100 acquires a frame included in the video image data (Step S103). Here, if the video image data is not present, the information processing apparatus 100 ends the process. In contrast, if the video image data is present, the information processing apparatus 100 identifies the entirety of the commodity product and the position of the bar code by using the machine learning model 104 or pattern matching (Step S104).

Here, if an abnormal behavior is not detected on the basis of the position of the bar with respect to the entirety of the commodity product (No at Step S105), the information processing apparatus 100 repeats the process at Step S103 and the subsequent processes. In contrast, if an abnormal behavior has been detected (Yes at Step S105), the information processing apparatus 100 detects a fraud (Step S106), makes an alert report (Step S107), and ends the process.

Effects

As described above, the information processing apparatus 100 identifies each of the entire region of the commodity product and the position of the bar code held by the commodity product, and generates, on the basis of the position of the bar code held by the commodity product with respect to the identified entire region of the commodity product, an alert that indicates an abnormality of a behavior of registering the commodity product to the self-service checkout register 50. Therefore, the information processing apparatus 100 is able to detect a fraud conducted at the self-service checkout register 50.

In addition, the information processing apparatus 100 identifies each of the entire region of a set commodity product that is set as a single commodity product containing a plurality of commodity products each having a code and that has a code as the single commodity product and the position of the bar code held by the set commodity product. Then, the information processing apparatus 100 generates an alert in the case where the code of one of the commodity products included in the set commodity product is located at the position at which the commodity product is to be registered to the self-service checkout register 50. Therefore, the information processing apparatus 100 is able to detect a fraud conducted to purchase a set commodity product at a price assigned to a single item.

In addition, the information processing apparatus 100 estimates the position of the bar code held by the commodity product included in the video image data by inputting the video image data to the machine learning model in which the position of the code has been trained for each commodity product. Then, the information processing apparatus 100 generates an alert in the case where the estimated position of the bar code held by the commodity product does not match the position of the code of the commodity product located at the position at which the commodity product is to be registered to the self-service checkout register 50. Therefore, the information processing apparatus 100 is able to detect a fraud conducted by grip a high-priced commodity product and a low-priced commodity product in an overlapped manner, and pretending to have purchased the high-priced commodity product by scanning the low-priced commodity product.

In addition, the information processing apparatus 100 generates an alert indicating that there is a commodity product that has not yet been registered to the self-service checkout register 50 by a person, or, indicating that the commodity product that has been registered to the self-service checkout register 50 by a person is abnormal. Therefore, a store clerk or the like is able to react by listening the circumstances by using the information processing apparatus 100 before the person who has exhibited the fraudulent behavior leaves the store.

In addition, if an alert related to an abnormality of a behavior of registering the commodity product to the self-service checkout register 50 has been generated, the information processing apparatus 100 outputs, from the self-service checkout register 50, a voice or a screen that makes the person located at the self-service checkout register 50 aware of a registration omission of the commodity product. Therefore, the information processing apparatus 100 is able to directly alert the person who is performing a scan even in a case of an inevitable mistake or even in a case of an intentional fraud, so that it is possible to reduce the mistake or the intentional fraud.

In addition, when an alert related to an abnormality of a behavior of registering the commodity product to the self-service checkout register 50 is generated, the information processing apparatus 100 causes the camera included in the self-service checkout register 50 to capture an image of the person, and stores the image data on the captured person and the alert in an associated manner in the storage unit. Accordingly, the information processing apparatus 100 is able to collect and hold the information on the fraudulent person who exhibits the fraudulent behavior, so that it is possible to make use of various measures to prevent the fraudulent behavior by detecting a visit of the fraudulent person to the store from the captured data obtained by the camera that captures a customer who visits the store. In addition, the information processing apparatus 100 is also able to acquire and store information on a credit card that is used by a person who has exhibited a fraudulent behavior from the self-service checkout register 50, so that it is possible to charge a fee via a credit card company in the case where the fraudulent behavior has been confirmed.

(b) Second Embodiment

By the way, the information processing apparatus 100 is able to improve detection accuracy of an abnormal behavior by generating a two-dimensional image and a three-dimensional model of a commodity product by analyzing the video image data, and by improving the detection accuracy of the bar code position of the commodity product.

Functional Configuration

FIG. 13 is a functional block diagram illustrating a functional configuration of according to a second embodiment. As illustrated in FIG. 13, the information processing apparatus 100 includes the communication unit 101, the storage unit 102, and the control unit 110. Here, a pattern DB 106 and a generation model 107 that are different functions as those in the first embodiment, and the processing units related to these units will be described.

The pattern DB 106 is a database that stores therein patterns each of which indicates the position of the bar code held by the commodity product. FIG. 14 is a diagram illustrating an example of the information stored in the pattern DB 106. As illustrated in FIG. 14, the pattern DB 106 stores therein items of "a surface of a commodity product, a pattern, and a position of the bar code" in an associated manner.

The "pattern" stored here is an identifier for identifying a pattern. The "surface of the commodity product" is information that indicates a surface on which the label of the commodity product is described. The "position of the bar code" is information that indicates the position of the bar code held by the commodity product. In the example illustrated in FIG. 14, a pattern 1 is a pattern in which, when the label of the commodity product is located at both of the "top surface" and the "side surface", a bar code is present at the "position opposite to the label". A pattern 2 is a pattern in which, when the label of the commodity product is located at the "top surface", the bar code is present on the side surface of the commodity product. In addition, each of the patterns may be set for each commodity product, or may be set for each category of the commodity product.

The generation model 107 is a machine learning model that is used for generating, in accordance with an input of the video image data, a three-dimensional model of the commodity products captured in the video image data. For example, the generation model 107 generates and outputs a three-dimensional model of the commodity products with respect to each of the pieces of image data (each frame) included in the video image data.

The machine learning unit 111 is a processing unit that performs machine learning on the generation model 107 by using each of the pieces of training data. FIG. 15 is a diagram illustrating machine learning performed on the generation model 107. As illustrated in FIG. 15, the machine learning unit 111 inputs training data in which the "image data" is used as an explanatory variable and the "three-dimensional model" is used as an objective variable (correct answer information) to the generation model 107, and calculates error information indicating an error between the output result of the "three-dimensional model" and the objective variable of the "three-dimensional model" in the machine learning model 104. Then, the machine learning unit 111 performs machine learning that updates the parameters of the generation model 107 by using error back propagation such that the error is decreased.

The identification unit 113 recognizes a pattern on the surface of the commodity product in the two-dimensional image by analyzing the video image data, and specifies the position of the code with respect to the pattern. For example, the identification unit 113 acquires a two-dimensional image of the commodity product from the image data included in the video image data, performs pattern matching or the like on the two-dimensional image, and identifies the position of the label of the commodity product and the bar code position of the commodity product.

The fraud detection unit 114 detects a fraudulent behavior by using the identification result obtained by the identification unit 113. Specifically, the fraud detection unit 114 acquires "the position of the label of the commodity product and the bar code position of the commodity product" from the identification unit 113, and detects a fraudulent behavior according to whether or not the acquired position correspond to the pattern stored in the pattern DB 106.

Specifically, it is assumed that the fraud detection unit 114 has acquired the "label position of the commodity product is the top surface" and "the bar code position of the commodity product is the top surface" from the identification unit 113. In this case, the fraud detection unit 114 refers to the pattern DB 106, specifies the "pattern 1" that is associated with the "label position of the commodity product is the top surface", and specifies the "position opposite to the label" that corresponds to the pattern 1. Then, the bar code position of the "top surface" that has been identified from the commodity product is different from the pattern 1 indicating the "position opposite to the label", so that the fraud detection unit 114 determines that this indicates a fraudulent behavior.

In addition, the fraud detection unit 114 is able to generate the three-dimensional model of the commodity product by inputting the video image data to the machine learning model and detect a fraudulent behavior in the case where the position of the bar code obtained from the three-dimensional model is different from the position that is set in advance.

FIG. 16 is a diagram illustrating fraud detection. As illustrated in FIG. 16, the fraud detection unit 114 inputs image data to the generation model 107, and generates a 3D model of the commodity product included in the image data. Then, the fraud detection unit 114 performs the fraud detection by comparing the generated 3D model with the relative position described in the first embodiment and with the pattern described above.

Effects

As described above, the information processing apparatus 100 recognizes, by analyzing the video image data, the surface pattern of the commodity product included in the two-dimensional image and specifies the position of the code with respect to the pattern. Then, if the specified position of the code with respect to the pattern is different from the position that has been set in advance for each pattern, the information processing apparatus 100 generates an alert that indicates an abnormality of a behavior of registering the commodity product to the self-service checkout register 50. Therefore, even when a fraud that is not occurred in the past or a new fraud that is not assumed has occurred, the information processing apparatus 100 is able to detect a fraud on the ground of the pattern obtained based on the positional relationship or the like.

In addition, the information processing apparatus 100 generates the three-dimensional model of the commodity product by inputting the video image data to the generation model 107. Then, if the position of the code in the generated three-dimensional model is different from the position that is set in advance, the information processing apparatus 100 generates an alert that indicates an abnormality of a behavior of registering the commodity product to the self-service checkout register 50. Therefore, the information processing apparatus 100 is able to improve the accuracy of comparison with the relative position or the pattern, so that the information processing apparatus 100 is also able to improve the detection accuracy of the fraudulent behavior. In addition, the information processing apparatus 100 is able to visually specify a bar code position by using the 3D model, so that a store clerk is able to visually determine whether or not a bar code position is present at the scan position while viewing the video image data.

(c) Third Embodiment

In the above explanation, a description has been given of the embodiments according to the present invention; however, the present invention may also be implemented with various kinds of embodiments other than the embodiments described above.

Numerical Value, Etc.

The number of self-service checkout registers and cameras, examples of numerical values, examples of the training data, the number of pieces of training data, the machine the learning models, each of the class names, the number of classes, the data formats, and the like that are used in the embodiment described above are only examples and may be arbitrarily changed. Furthermore, the flow of the processes descried in each of the flowcharts may be changed as long as the processes do not conflict with each other. In addition, a model generated from various algorithms, such as a neural network, may be used for each of the models.

In addition, regarding a scan position and a position of a shopping basket, the information processing apparatus 100 is also able to use a known technology, such as another machine learning model for detecting a position, an object detection technology, or a position detection technology. For example, the information processing apparatus 100 is able to detect a position of a shopping basket on the basis of a difference between frames (image data) and a change in frames in time series, so that the information processing apparatus 100 may also perform detection by using the difference between frames and the change in frames in time series, or may also generate another model by using the difference between frames and the change in frames in time series. Furthermore, by designating a size of the shopping basket in advance, the information processing apparatus 100 is also able to identify the position of the shopping basket in the case where an object with that size has been detected from the image data. In addition, the scan position is a position that is fixed to an extent, so that the information processing apparatus 100 is also able to identify the position designated by an administrator or the like as the scan position.

System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. For example, the identification unit 113 and the fraud detection unit 114 may be integrated. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Furthermore, all or any part of each of the processing functions performed by each of the devices can be implemented by a CPU and by programs analyzed and executed by the CPU or implemented as hardware by wired logic.

Hardware

FIG. 17 is a diagram illustrating an example of a hardware configuration. Here, as one example, the information processing apparatus 100 will be described. As illustrated in FIG. 17, the information processing apparatus 100 includes a communication device 100a, a hard disk drive (HDD) 100b, a memory 100c, and a processor 100d. In addition, each of the units illustrated in FIG. 17 is connected each other via a bus or the like.

The communication device 100a is a network interface card or the like, and communicates with another device. The HDD 100b stores therein programs and the DB that operate the function illustrated in FIG. 3.

The processor 100d operates the process that executes each of the functions described above in FIG. 3 or the like by reading the programs that execute the same process as that performed by each of the processing units illustrated in FIG. 3 from the HDD 100b or the like and loading the read program in the memory 100c. For example, the process executes the same function as that performed by each of the processing units included in the information processing apparatus 100. Specifically, the processor 100d reads, from the HDD 100b or the like, the programs having the same function as that performed by each of the machine learning unit 111, the video image acquisition unit 112, the identification unit 113, the fraud detection unit 114, the warning control unit 115, and the like. Then, the processor 100d executes the process for executing the same process as that performed by each of the machine learning unit 111, the video image acquisition unit 112, the identification unit 113, the fraud detection unit 114, the warning control unit 115, and the like.

In this way, the information processing apparatus 100 is operated as an information processing apparatus that executes an information processing method by reading and executing the programs. In addition, the information processing apparatus 100 is also able to implement the same function as that described above in the embodiment by reading the programs described above from a recording medium by a medium recording device and executing the read programs described above. In addition, the programs described in another embodiment are not limited to be executed by the information processing apparatus 100. For example, the embodiment described above may also be similarly used in a case in which another computer or a server executes a program, or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

FIG. 18 is a diagram illustrating an example of a hardware configuration of the self-service checkout register 50. As illustrated in FIG. 18, the self-service checkout register 50 includes a communication interface 400a, a HDD 400b, a memory 400c, a processor 400d, an input device 400e, and an output device 400f. In addition, each of the units illustrated in FIG. 18 is connected each other via a bus or the like.

The communication interface 400a is a network interface card or the like, and communicates with another device. The HDD 400b stores therein programs and data that operate each of the functions of the self-service checkout register 50.

The processor 400d is a hardware circuit that operates the process that executes each of the functions of the self-service checkout register 50 by reading the program that executes the process of each of the functions of the self-service checkout register 50 from the HDD 400b or the like and loading the read program in the memory 400c. In other words, the process executes the same function as that performed by each of the processing units included in the self-service checkout register 50.

In this way, by reading and executing the program for executing the process of each of the functions of the self-service checkout register 50, the self-service checkout register 50 is operated as an information processing apparatus that performs an operation control process. Furthermore, the self-service checkout register 50 is also able to implement each of the functions of the self-service checkout register 50 by reading the programs from a recording medium by a medium reading device and executing the read programs. In addition, the programs described in another embodiment are not limited to be executed by the self-service checkout register 50. For example, the present embodiment may also be similarly used in a case in which another computer or a server execute a program, or in a case in which another computer and a server cooperatively execute a program with each other.

Furthermore, the programs that execute the process of each of the functions of the self-service checkout register 50 can be distributed via a network, such as the Internet. Furthermore, these programs can be executed by recording the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input device 400e detects various input operations performed by a user, such as an input operation performed with respect to the programs executed by the processor 400d. Examples of the input operation include a touch operation or the like. In a case of the touch operation, the self-service checkout register 50 further includes a display unit, and the input operation detected by the input device 400e may be a touch operation performed on the display unit. The input device 400e may be, for example, a button, a touch panel, a proximity sensor, or the like. In addition, the input device 400e reads a bar code. The input device 400e is, for example, a bar code reader. The bar code reader includes a light source and an optical sensor and scans the bar code.

The output device 400f outputs data that is output from the program executed by the processor 400d via external device, such as an external display device, that is connected to the self-service checkout register 50. In addition, in the case where the self-service checkout register 50 includes a display unit, the self-service checkout register 50 need not include the output device 400f.

According to an aspect of an embodiment, it is possible to detect an error made or a fraud conducted at an accounting machine by a user.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
   acquiring video image data on a person who is scanning a code of a commodity product to an accounting machine;
   identifying, by performing analysis of the acquired video image data, a pattern of a surface of the commodity product in a two-dimensional image, and specifying a position of a code held by the commodity product with respect to the pattern; and
   generating, when the specified position of the code with respect to the pattern is different from a position that is set for each pattern in advance, an alert that indicates an abnormality of a behavior of registering the commodity product to the accounting machine.

2. The non-transitory computer-readable recording medium according to claim 1, wherein the generating includes generating, as the alert related to the abnormality of the behavior of registering the commodity product to the accounting machine, an alert indicating that there is a commodity product that has not yet been registered to the accounting machine by the person, or, indicating that the commodity product that has been registered to the accounting machine by the person is abnormal.

3. The non-transitory computer-readable recording medium according to claim 1, wherein the process further includes notifying, when the alert related to the abnormality of the behavior of registering the commodity product to the accounting machine is generated, a terminal used by a store clerk of identification information on the accounting machine and the generated alert in an associated manner.

4. The non-transitory computer-readable recording medium according to claim 1, wherein the generating includes outputting, in a case where the alert related to the abnormality of the behavior of registering the commodity product to the accounting machine has been generated, voice or a screen that makes the person located at the accounting machine aware of a registration omission of the commodity product from the accounting machine.

5. The non-transitory computer-readable recording medium according to claim 1, wherein the process further includes:
   capturing, when the alert related to the abnormality of the behavior of registering the commodity product to the accounting machine has been generated, the person by a camera included in the accounting machine; and
   storing image data on the captured person and the alert in an associated manner in a storage.

6. The non-transitory computer-readable recording medium according to claim 1, wherein
   a set commodity product is constituted such that a bar code is assigned to a wrapping material that wraps a set of a plurality of cans and another bar code is assigned to each of the cans wrapped by the wrapping material, wherein the process further includes:
   notifying the alert when the bar code of one of the cans is scanned to the accounting machine instead of the bar code of the wrapping material.

7. The non-transitory computer-readable recording medium according to claim 1, wherein the accounting machine is a self-service checkout terminal.

8. A non-transitory computer-readable recording having stored therein an information processing program that causes a computer to execute a process comprising:
   acquiring video image data on a person who is scanning a code of a commodity product to an accounting machine;
   generating, by inputting the acquired video image data to a machine learning model, a three-dimensional model of the commodity product, and
   generating, when a position of a code held by the commodity product in the generated three-dimensional model is different from a position that is set in advance, an alert that indicates an abnormality of a behavior of registering the commodity product to the accounting machine.

9. A non-transitory computer-readable recording medium having stored therein an information processing program that causes a computer to execute a process comprising:
   acquiring video image data on a person who is scanning a code of commodity product to an accounting machine;
   identifying, by performing analysis of the acquired video image data, each of
      an entire region of a set commodity product
         that is set as a single commodity product containing a plurality of commodity products each having a code, and
         that has a code as the single commodity product, and
      a position of the code held by the set commodity product, and
   generating an alert in a case where the code of one of the commodity products included in the set commodity product is located at a position at which a commodity product is to be registered to the accounting machine, the alert indicating an abnormality of a behavior of registering the set commodity product to the accounting machine.

10. A non-transitory computer-readable recording medium having stored therein an information processing program that causes a computer to execute a process comprising:
   acquiring video image data on a person who is scanning a code of a commodity product to an accounting machine;
   estimating a position of a code held by the commodity product included in the video image data by inputting the acquired video image data to a machine learning model in which the position of the code has been trained for each commodity product, and
   generating an alert in a case where the estimated position of the code held by the commodity product does not match a position of the code of the commodity product located at a position at which the commodity product is to be registered to the accounting machine, the alert indicating an abnormality of a behavior of registering the commodity product to the accounting machine.

* * * * *